(12) United States Patent
Kannan et al.

(10) Patent No.: US 8,208,381 B2
(45) Date of Patent: Jun. 26, 2012

(54) ROOT-CAUSE APPROACH TO PROBLEM DIAGNOSIS IN DATA NETWORKS

(75) Inventors: Raja Kannan, Chennai (IN); Srinivas Ramanathan, Canton, MI (US); Sreedharan Subramanian, Chennai (IN); Balamurugan Vaidhinathan, Franklin Park, NJ (US)

(73) Assignee: EG Innovations PTE. Ltd., Singapore (SG)

( * ) Notice: Subject to any disclaimer, the term of this patent is extended or adjusted under 35 U.S.C. 154(b) by 777 days.

(21) Appl. No.: 11/829,875

(22) Filed: Jul. 27, 2007

(65) Prior Publication Data
US 2009/0028053 A1 Jan. 29, 2009

(51) Int. Cl.
*H04L 12/26* (2006.01)
(52) U.S. Cl. .............. 370/241; 370/241.1; 370/242
(58) Field of Classification Search .......... 370/242, 370/241.1, 241; 719/318; 340/14.01
See application file for complete search history.

(56) References Cited

U.S. PATENT DOCUMENTS

| | | | | |
|---|---|---|---|---|
| 5,946,373 | A | * | 8/1999 | Harris .................. 379/14.01 |
| 6,707,795 | B1 | * | 3/2004 | Noorhosseini et al. ....... 370/242 |
| 2004/0237077 | A1 | * | 11/2004 | Cole et al. .................. 717/162 |
| 2005/0146426 | A1 | * | 7/2005 | Pereira et al. .............. 340/506 |
| 2008/0276253 | A1 | * | 11/2008 | Khandrika et al. .......... 719/318 |
| 2009/0024994 | A1 | * | 1/2009 | Kannan et al. .............. 718/1 |

* cited by examiner

*Primary Examiner* — Huy D Vu
*Assistant Examiner* — Omer Mian
(74) *Attorney, Agent, or Firm* — Intellectual Property Law Group LLP

(57) ABSTRACT

An improved root-cause approach to problem diagnosis in data networks in the form of a method comprising the steps of: associating each metric in a at least one set of metrics with at least one component and/or network device; obtaining values for each such metric from a monitoring system; determining whether each such metric is indicative of a problem within the data network; and ranking and correlating indicative problems to determine whether a problem may be symptomatic of another problem based on an interconnection and/or interdependency between a physical machine and a virtual machine, between components or between components and network devices.

14 Claims, 5 Drawing Sheets

ROOT-CAUSE APPROACH TO PROBLEM DIAGNOSIS IN DATA NETWORKS

CROSS-REFERENCE

This application claims benefit of priority to U.S. application Ser. No. 11/781,156, and its corresponding PCT International Application entitled "Monitoring System for Virtual Application Environments", both filed on Jul. 20, 2007, which are hereby incorporated by reference.

FIELD OF THE INVENTION

The invention relates to an improved root-cause approach to problem diagnosis in data networks. The invention is particularly suited to diagnosing problems in a data network including at least one virtual machine.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

In U.S. Pat. No. 6,701,459, the applicants disclosed a root-cause approach to problem diagnosis in data networks. However, the recent increased utilisation of virtual machines as part of data networks has resulted in the diagnostic approach recited therein no longer providing a proper assessment of potential root-cause problems.

To elaborate, it is to be remembered that virtual machines are inter-related with the physical computer systems on which they operate since they share a common pool of central processing unit ("CPU"), memory, disk space and storage resources. Accordingly, a malfunctioning application running on one virtual machine may result in other virtual machines hosted on the same physical computer system being starved of resources which should otherwise be available to them. Similarly, abnormal processes on the physical computer system may result in poor performance of applications running on each virtual machine hosted thereon.

The root-cause diagnosis problem is further complicated because the virtual machines may themselves be dynamically moved between physical computer systems during operation. At the same time their identity (eg. IP address, hostname, etc.) remains the same and the applications executing on the re-located virtual machine continue to operate in the same manner, i.e. independent of the new physical machine(s) on which the virtual machine is running. This dramatically increases the difficulties in diagnosing potential root-cause problems as the relationship (or where the virtual machine is hosted across multiple machines—relationships) between physical computer systems and virtual machines need to be constantly updated.

Accordingly, it is an object of the present invention to provide an improved root-cause diagnosis process that takes into account at least some of the problems associated with analysing data networks that include virtual machines.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is an improved root-cause approach to problem diagnosis in data networks in the form of a method comprising the steps of:
  associating each metric in a at least one set of metrics with at least one component and/or network device
  obtaining values for each such metric from a monitoring system;
  determining whether each such metric is indicative of a problem within the data network; and
  ranking and correlating indicative problems to determine whether a problem may be symptomatic of another problem based on an interconnection and/or interdependency between a physical machine and a virtual machine, between components or between components and network devices.

The method may include the step of obtaining and storing information on the interconnection and interdependencies between each physical machine and virtual machine in the data network and where the step of ranking and correlating indicative problems includes the sub-step of ranking and correlating indicative problems to determine whether a problem may be symptomatic of another problem based on the stored physical/virtual machine interconnection and interdependency information. The method may also include the step of obtaining and storing information on the interconnection and interdependencies between components and between components and network devices and where the step of ranking and correlating indicative problems includes the sub-step of performing end-to-end correlation of the indicative problems based on the stored component/network interconnection and interdependency information.

In an additional form of the invention the method includes the steps of:
  defining a hierarchical layer model;
  associating each layer in the hierarchical layer model with a set of metrics.

In this form, the step of ranking and correlating indicative problems includes the sub-step of performing top-to-bottom correlation of the indicative problems based, at least in part, on the hierarchical layer model.

Preferably, the step of obtaining information on the interconnection and interdependencies between each physical machine and virtual machine in the data network is repeatedly obtained and compared to the prior stored information on the interconnection and interdependencies between each physical machine and virtual machine in the data network and if the information so obtained differs from the prior stored information, storing the obtained information in place of the prior stored information.

Additionally, the step of obtaining information on the interconnection and interdependencies between components and between components and network devices is repeatedly obtained and compared to the prior stored information on the interconnection and independencies between components and between components and network devices and if the information so obtained differs from the prior stored information, storing the obtained information in place of the stored information.

The method can also include the step of defining a set of priority queues and the step of ranking the indicative problems is made with reference to the priority queues. Where the method allows, the step of performing end-to-end correlation may be performed on each priority queue in turn. Similarly, the step of performing top-to-bottom correlation may be performed between each priority queue and the next lowest priority queue, if any.

Ideally, the method includes the step of demoting any indicative problem determined to be symptomatic of another indicative problem to the next lowest priority queue where possible to do so.

The method may further operate so that those indicative problems relating to the layer upon which all other layers are dependent are processed first. This is valuable as the root-cause of any problems in the data network is likely to arise here.

Preferably, each indicative problem is associated with a component name which includes a port number and each metric is associated with a port number, the method including the step of comparing the port number of the component name with the port number of the associated metric and, if the comparison shows that the indicative problem is independent of the port number, the component name is modified to delete the associated port number.

In accordance with additional aspects of the invention there is a system for implementing an improved root-cause approach to problem diagnosis in data networks and a computer readable medium having computer software stored thereon for executing the method as described in the first aspect of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

Figure 1:
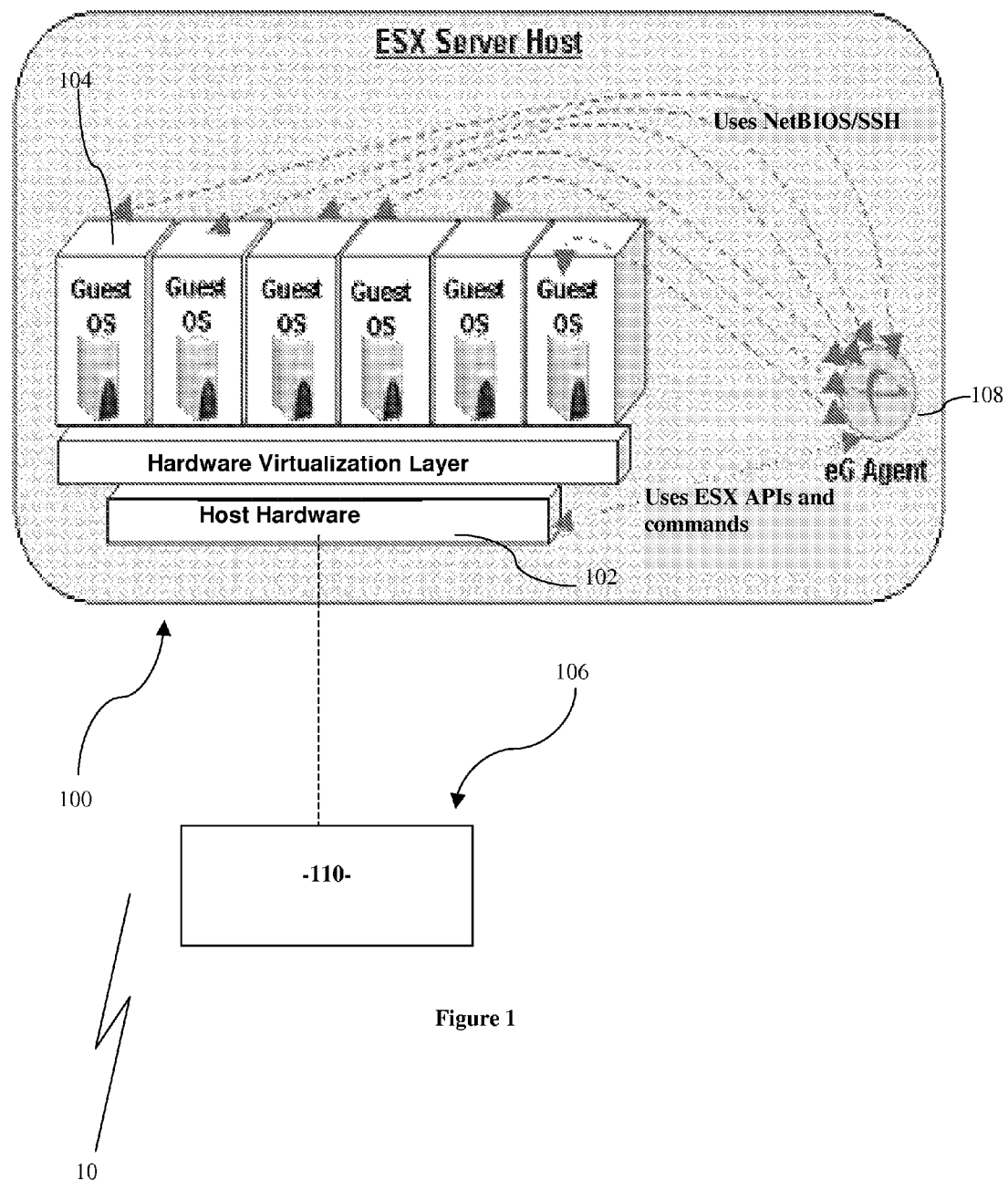
FIG. 1 is a schematic representation of a data network to be analysed in accordance with the present invention.

In accordance with a first embodiment of the present invention there is an improved root cause diagnostic process 10. The root cause diagnostic process 10 operates to diagnose problems in a data network 100. The data network 100 includes at least one physical machine 102 and at least one virtual machine 104. The virtual machines 104 may be hosted by one or more of the at least one physical machines 102.

The invention will be described with reference to a monitoring system 106 operable to provide certain metrics relating to the physical machines 102 and virtual machines 104. With respect to this particular embodiment, the monitoring system concerned is the monitoring system as described in the first embodiment of the applicant's co-pending application entitled "Monitoring System for Virtual Application Environments" having the same priority date as the present application.

The monitoring system 106 as described in the co-pending application is slightly modified in processing, but retains the structural elements of agent programs 108 and a single manager program 10. This modification is described with reference to FIGS. 1 and 3.

Step 12 sees each agent program 108 and the manager program 110 analyse their respective physical machines 102. This analysis is aimed at determining a predetermined set of information in respect of the physical machine 102 and each virtual machine 104 hosted by the physical machine 102 (if any).

In this embodiment, the predetermined set of information includes the IP addresses and host names of each such physical machine 102 and virtual machine 104. To provide an example of how this can be obtained, where the physical machine 102 is executing the Linux™ operating system, the "ifconfig" command is used to obtain the IP address of the physical machine 102. Domain Name Server ("DNS") lookups of the IP addresses can then provide the host name of the physical machine 102.

In order to determine the number of, and IP addresses for, each virtual machine 104 the application programming interface ("API") of the virtualisation technology running on the physical machine is used Again, for example purposes, the physical machine 102 uses VMware technology from VMWare, Inc. of Palo Alto, Calif. to support the hosting of the virtual machines. This software is then used as follows.

A connection is established with the VMware server using the $server->connect method call. Once the connection is established, the $server-registered_vm_names( ) method call can be used to obtain a list of all registered virtual machines 104 on that server. For each virtual machine so discovered, a connection to the virtual machine 104 using the $vm->connect($connect_params,$config) method call. The $vm->get_guest_info('ip') call can then be used to obtain the IP addresses of each virtual machine 104. The $vm->get_execution_state( ) method call can then be used to determine if the virtual machine 104 is set to an on state or not. This is important, as there is no need to include virtual machines 104 set to an off state in the root-cause analysis process. Finally, a further round of DNS lookups using the IP address of each virtual machine 104 allows the hostnames of such virtual machines 104 to be collected.

At the same time, the agent program 108 also obtains, as part of the predetermined set of information, information relating to what applications are running on each system (physical machine 102 or virtual machine 104), the relationships between such applications and the relationship between applications and network devices. The applications running on a system can be discovered using TCP port checks, eg.

TCP port 80 to find out information in respect of web servers;

TCP port 25 to find out information in respect of SMTP mail servers;

TCP port 1433 to find out information in respect of Microsoft™ SQL servers; and

TCP port 1521 to find out information in respect of Oracle™ databases.

Network devices can similarly be discovered using Simple Network Management Protocols ("SNMPs"), by polling specific Management Information Bases ("MIBs") for different devices. For example, the "traceroute" UniX™ command and the "tracert" Microsoft Windows™ command can be used to find the general network topology.

The relationships between applications can be discovered by using network sniffers to look at TCP packet transmissions between ports. The "netstat" command on a UniX™ server can also provide this information.

The predetermined set of information is then transmitted by each agent program 108 to the manager program 110, so that the manager program 110 can establish a physical/virtual relational map of the data network 100 as well as a dataflow graph of the data network 100 (step 14). The data flow graph defines the interconnections and interdependencies between applications/components and network devices.

Step 16 sees the manager program 110 determine whether any of the agent programs 108 are transmitting their respective predetermined set of information to it. If so processing continues to step 18, where the predetermined set of information is used by the manager program 110 to create a relational map of the physical machines 102 and virtual machines 104 in the data network 100 as well as a dataflow graph of the data network 100. The new relational map and dataflow graph are then compared with the existing relational map/dataflow graph at step 20 to determine whether the relational map or dataflow graph has changed.

If the relational map or dataflow graph has changed, the new relational map or dataflow graph (as created at step 18) is stored by the manager program 110 in a configuration file for later reference (step 22).

If:
no agent program 108 is transmitting their predetermined set of information to the manager program 110;
the relational map or dataflow graph has not changed; OR
the relational map or dataflow graph has changed and the new relational map or dataflow graph has been stored in the configuration file,
processing returns to step 12 after waiting a predetermined period of time (step 24). This loop, operating as a separate thread to the analysis process, is repeated indefinitely to allow the interconnections and interrelationships of the data network 100, as known to the manager program 110, to be constantly updated.

Figure 2:
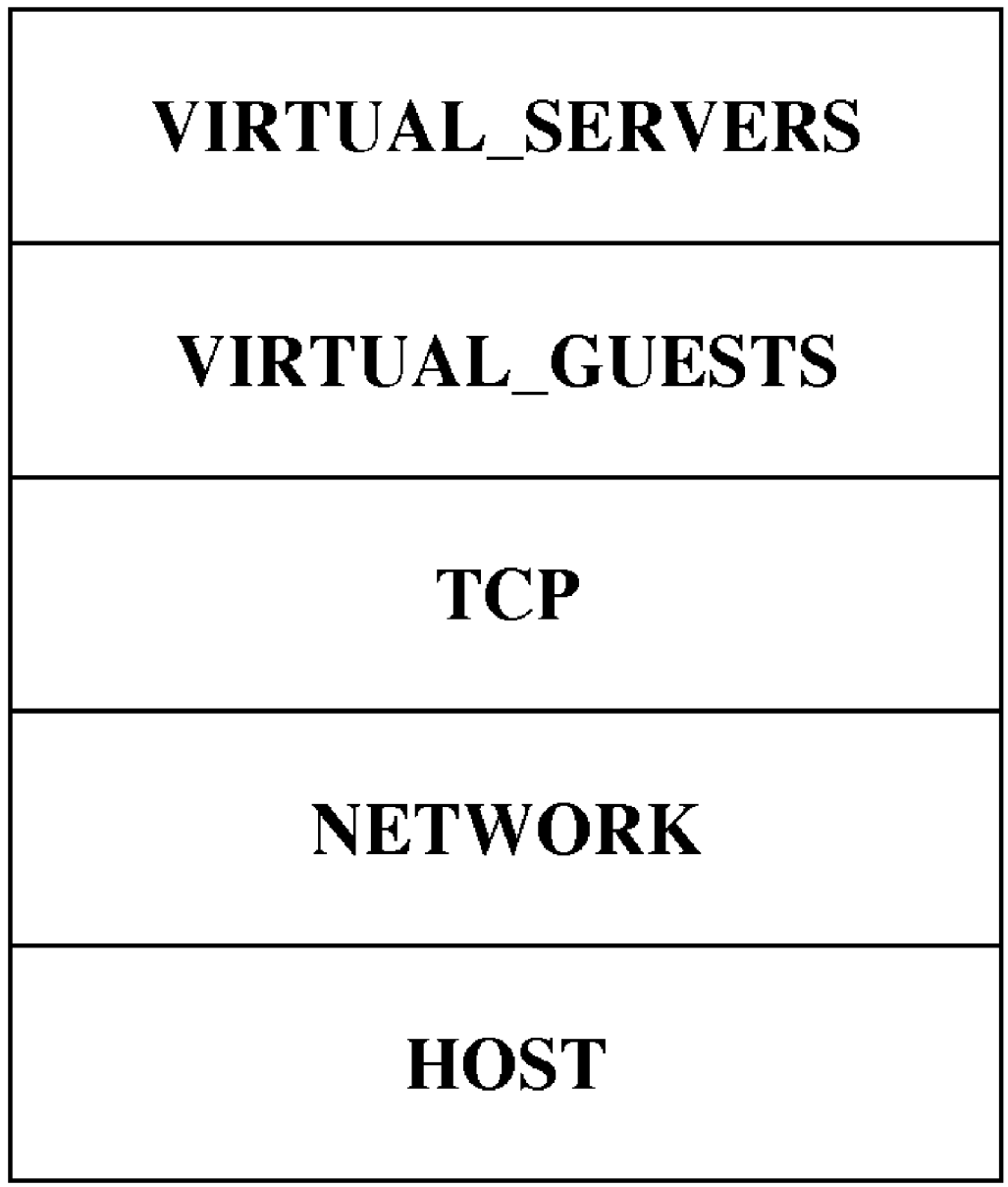
FIG. 2 is a model illustrating the various layers of the data networks the subject of the improved root cause approach to problem diagnosis according to the present invention.
Figure 3:
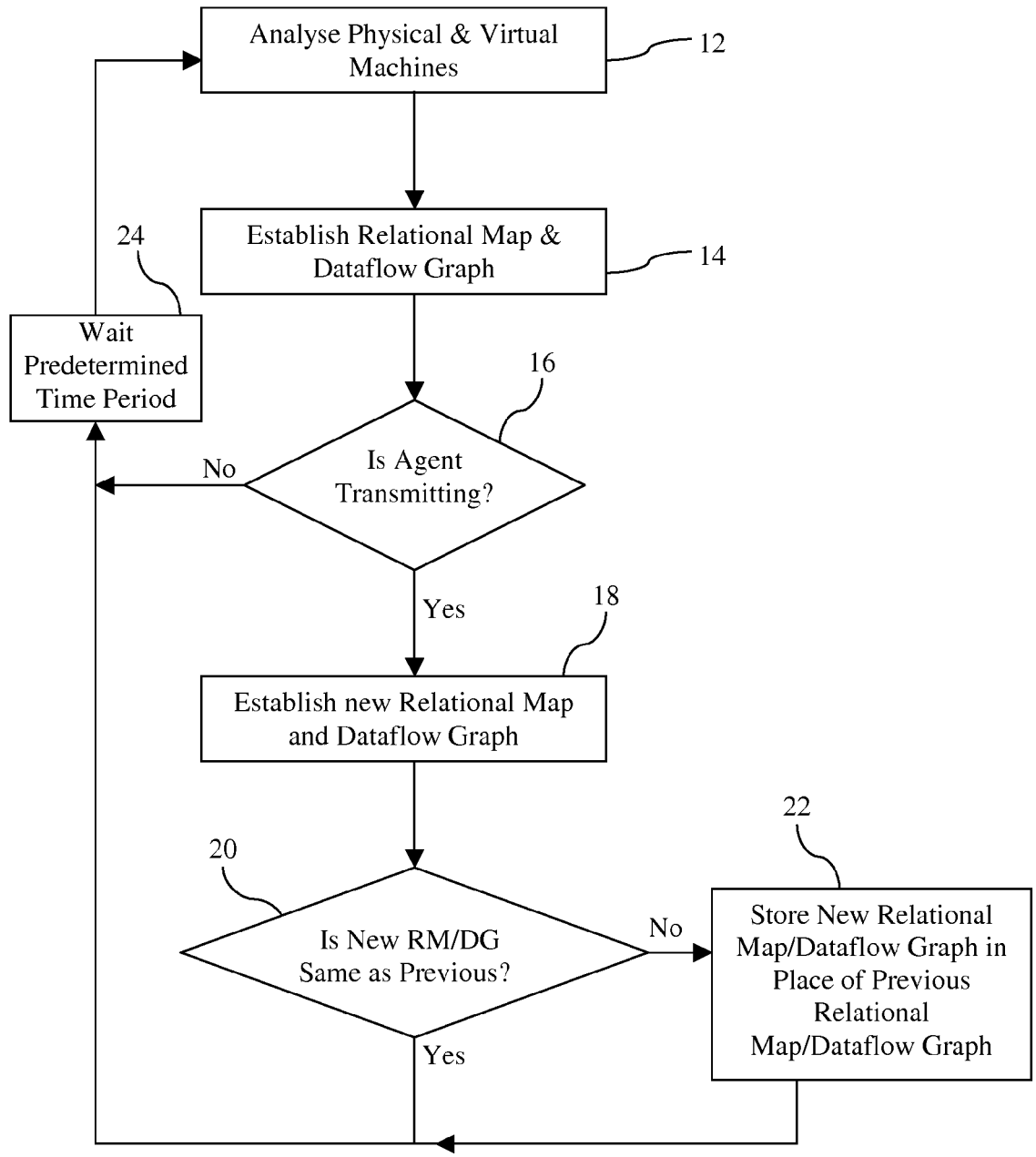
FIG. 3 is a first flow-chart of an improved root-cause approach to problem diagnosis in data networks according to the present invention.

The actual root-cause diagnostic process 10 is able to operate once the discovery process referred to above with reference to FIGS. 1 and 3 has executed at least once and a layer model has been defined. In this embodiment, the layer model is as shown in FIG. 2. The HOST layer monitors the CPU, memory and disk utilisation of the physical machine 102 as well as the status of physical server hardware (i.e. temperature, voltage, etc.). The NETWORK layer monitors the network connectivity to the physical machine 102 and the traffic to network interfaces of the physical machines 102. The TCP layer monitors the TCP protocol traffic to the physical machine 102. The VIRTUAL_GUESTS layer represents the view of the virtual machine 104 as taken from the perspective of the physical machine 102. The VIRTUAL_SERVERS layer represents the view of the virtual machines 104 as taken from the perspective of the operating system executing on the virtual machine 104. As shown in the Figure, each layer depends on its lower layers to function properly.

Each layer in the layer model is also correlated at the time of definition to a set of metrics. The importance of this correlation will be described in more detail below.

Figure 4:
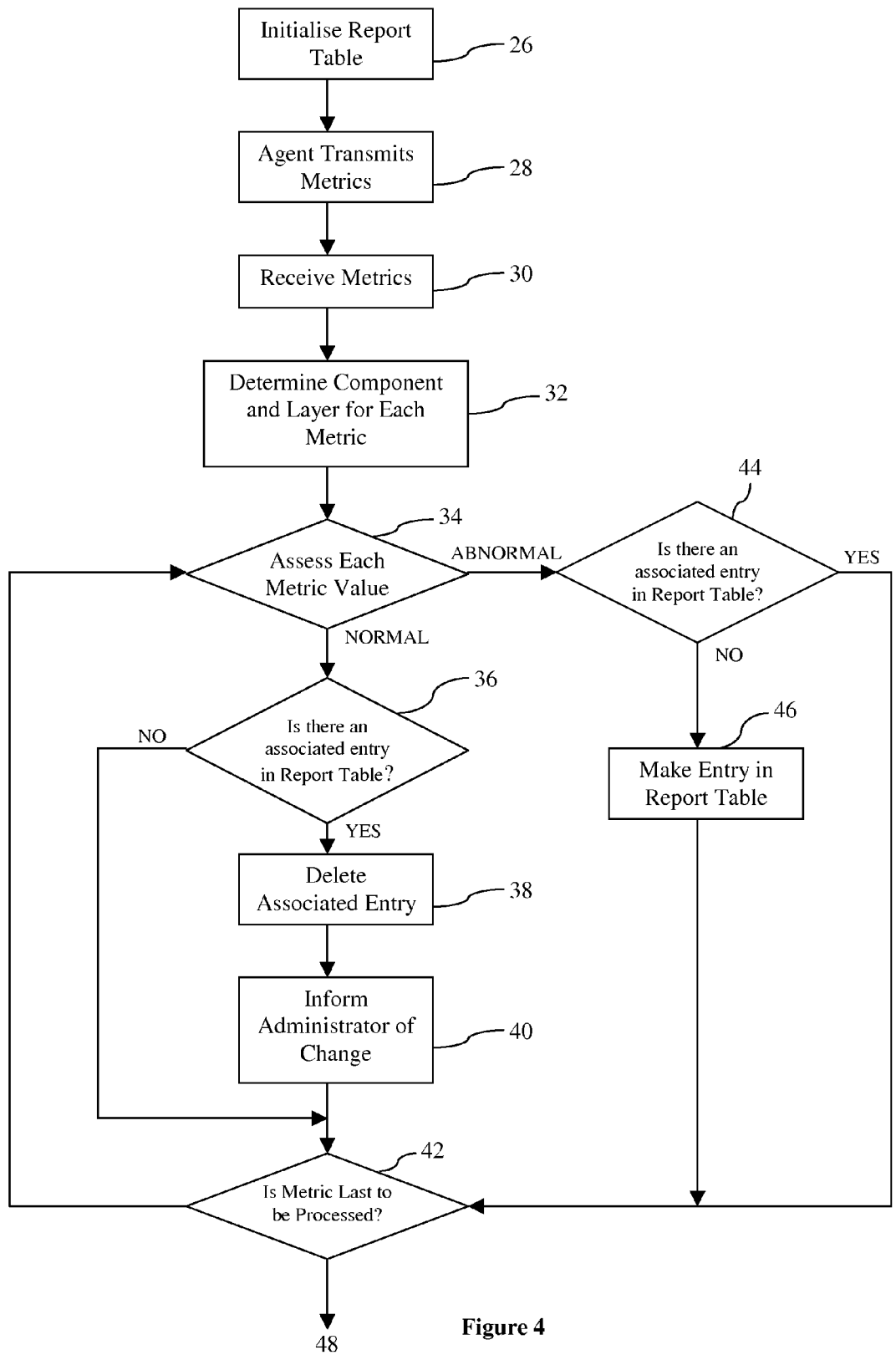
FIG. 4 is a second flow-chart of the improved root-cause approach to problem diagnosis in data networks shown in FIG. 3.
Figure 5:
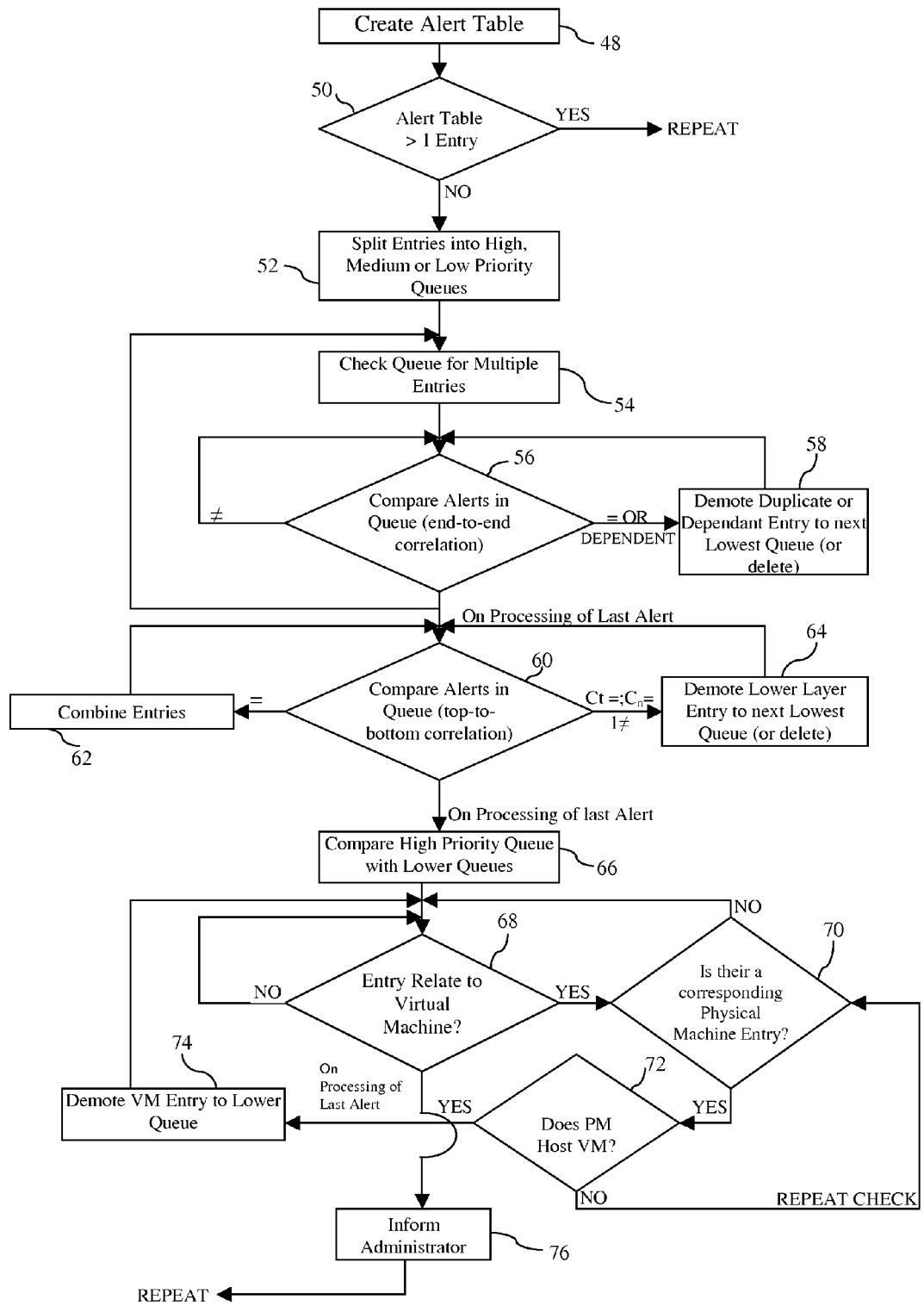
FIG. 5 is a third flow-chart of the improved root-cause approach to problem diagnosis in data networks shown in FIG. 3.

The root-cause diagnostic process 10 will now be described below with reference to FIGS. 4 and 5.

At step 26, a report table is initialised. The report table represents a list of components that have been identified as being in an "abnormal" state. Once each report table is initialised, the manager program 110 waits for values for preset metrics to be transmitted to it from agent programs 108 (step 28). Step 30 sees the manager program 110 receive such values from an agent program 110.

Each metric value is assessed to determine the layer to which it is related. This relationship between layer and component is made with reference to the set of metrics associated with each layer as defined in the layer model. At the same time, the component from which the metric value has been obtained (as communicated by the agent program 108) is related to the metric value (step 32).

Thereafter, each metric value is again assessed to determine whether the metric value is "normal" (for example by comparing the metric value to a specific "normal" value or range of values) (step 34). If the metric value assessed is "normal" processing continues to step 36. If not, processing continues to step 44.

Step 36 sees the manager program 110 check whether each component/layer combination associated with the "normal" metric value has a corresponding entry in the report table. If so the corresponding entry in the report table is deleted (step 38). The system administrators are thereafter informed that a previously identified "abnormal" component/layer combination has now become "normal" (step 40). Processing then continues at step 42.

However, if the component/layer combinations associated with the "normal" metric value do not have a corresponding entry in the report table, a check is made as to whether the metric value being processed is the last metric value to be processed (step 42). If so processing moves to step 48. If not, processing returns to step 34 where the next metric value is processed.

In a similar manner, step 44 sees the manager program 110 check whether each component/layer combination associated with the "abnormal" metric value has a corresponding entry in the report table. If such component/layer combinations do have corresponding entries, a check is made as to whether the metric value being processed is the last metric value to be processed (step 42). If so, processing moves to step 48. If not, processing returns to step 34 where the next metric value is processed.

If a component/layer combination associated with an "abnormal" metric does not have a corresponding entry in the report table, an entry is made in the report table for each such component/layer combination (step 46). Again, a check is thereafter made to determine whether the metric value being process is the last metric value to be processed (step 42). If so, processing moves to step 48. If not processing returns to step 34 where the next metric value is processed.

Step 48 sees the report table being re-formatted to form an alert table. As part of the reformatting, the following variables are attributed to each entry in the alert table:

Ct—the component type;
Cn—the component name; and
l—the layer

Optionally, each entry in the alert table may have the following additional variables:

t—the test
m—the measurement made by the test.

For the sake of ease of reference, the above variables will be suffixed by a number representative of the position of the entry in the appropriate queue (see below) to which the variable relates so as to evidence differences between entries.

Provided that the alert table has more than one entry (step 50), processing then continues as follows.

The manager program 110 begins to categorise the entries in the alert table into a high priority queue, a medium priority queue and a low priority queue (step 52). The categorisation is based on a predetermined assessment of the severity of any problem associated with the component/layer combination at the time of configuration.

The alert table is subsequently assessed to determine whether there are multiple entries in the high priority queue (step 54). If so, the manager program 110 performs an end-to-end correlation of the entries in the high priority queue.

This end-to-end correlation process commences with each alert being compared to each other alert in the high priority queue (step 56). To elaborate with reference to the comparison of the first and second entries in the high priority queue, the manager program 110 checks whether components are related as indicated by the dataflow graph. (ie. Ct1->Ct2 and Cn1->Cn2). If there is a dependency, the manager program 110 considers the two alerts as being duplicates and moves the first entry (ie. Ct1, Cn1) to the medium priority queue (step 58) while retaining the second entry (ie. Ct2, Cn2) in the high priority queue. If there is no dependency as indicated by the dataflow graph, both entries are retained in the high priority queue. This comparative process continues until all entries in the high priority queue have been compared with each other entry in the high priority queue.

An identical end-to-end correlation process is then performed in respect of the medium priority queue (with duplicated entries being moved to the low priority queue) and, in turn, the low priority queue (with duplicated entries being eliminated from the low priority queue).

On completion of the end-to-end correlation of each priority queue, each priority queue is subjected to a top-to-bottom correlation process. This top-to-bottom correlation process will be explained with reference to the high priority queue only (step 60). In this context, each entry in the high priority queue is compared with each other entry in the high priority queue. As part of this comparison:
- If Ct1=Ct2, Cn1=Cn2 and I1=I2, the two entries are considered to be aspects of a single alert. Accordingly, both entries are deleted from the high priority queue and replaced with a single entry having the optional variables of each deleted entry appended thereto (step 62).
- If Ct1=Ct2 and Cn1=Cn2 but I1>I2, the manager program 110 moves the first alert to the medium priority queue (Step 64).
- If Ct1=Ct2 and Cn1=Cn2 but I1<I2, the manager program moves the second alert to the medium priority queue (Step 64).

As with the end-to-end correlation process, in relation to entries moved when performing the top-to-bottom correlation on the medium priority queue, such entries are moved to the low priority queue. Similarly, entries moved when performing the top-to-bottom correlation on the low priority queue, such entries are deleted from the low priority queue rather than being moved.

At step 66 each entry in the high priority queue is compared with each entry in the medium priority queue and then each entry in the low priority queue. If this comparison identifies an identical entry in the medium priority queue, the medium priority entry is moved to the low priority queue. In the case of a comparison identifying identical entries in the low priority queue, however, the low priority queue entries are merged to form a single alarm.

The virtual environment is then dealt with at step 68 which sees each entry in the top and medium priority queues assessed to determine whether the entry relates to a virtual machine (as evidenced by the physical/virtual relational map). Typically, this assessment is done based on a check of the IP address and/or host name of the machine associated with those IP address values and machine names that form part of the physical/virtual relational map. This check commences by processing the entries in the high priority queue first, followed by the medium priority queue. Checks are not performed on the low priority queue as these entries cannot be demoted further.

If this check indicates that the entry in the priority queue relates to a virtual machine, processing continues to step 70. If not, processing returns to step 68 where the next entry in the priority queue is being processed. Of course, if the entry just processed is the last entry in the priority queue being processed, processing commences on the next lowest priority queue until the last entry in the low priority queue has been processed.

At step 70, a check is made of each other entry in the priority queue being processed to determine whether any such entry relates to a physical machine 102. If no such entries relate to a physical machine 102, processing returns to step 68 where the next entry in the priority queue being processed is assessed.

Alternatively, if any entry in the priority queue being processed does relate to a physical machine 102, an assessment is made to determine whether the virtual machine the subject of the entry being processed is hosted (in whole or in part) by the physical machine the subject of the other entry (step 72). If so, processing continues to step 74. If not, processing returns to step 70 where further comparisons of entries relating to physical machines 102 continues.

Upon identifying that a virtual machine 104 entry correlates to a physical machine 106 entry, the manager program 110 moves the virtual machine 104 entry to the next lowest priority queue (step 74). Processing then returns to step 68 where the next entry in the priority queue being processed is assessed.

On completion of assessment of all entries in the priority queues in accordance with the above steps, the process finishes with step 76 before repeating. At step 76, the administrator is informed of any changes in significance of any of the entries in any of the priority queues so that corrective action can be taken or verify that any corrective action taken has been effective, as appropriate.

It should be appreciated by the person skilled in the art that the above invention is not limited to the embodiment described. In particular, the following modifications and improvements may be made without departing from the scope of the present invention:

- The invention has been described above as an interrupt system whereby processing is performed on receipt of data from any one of a number of agents. However, the invention may be implemented in such a manner that the processing is performed on receipt of data from the last such agent to transmit. In a further alternative, the invention may be implemented to perform the processing at selected times and one or all of the agents may be programmed to transmit metric data in the intervening period.
- Similarly, the process has been described in a manner that the alert table is a child table of the report table. In other configurations, the report table and alert table may be separate, independent entities. In such a situation, the creation or deletion of an entry in one table will require a corresponding creation or deletion in the other table by a process as would be readily apparent to the person skilled in the art.
- The process may be modified such that prioritisation of entries in the alert table is performed at the time of creation of the entry in the alert table and not as a subsequent batch operation.
- The process by which the dataflow graph is created may be independent of the process by which the physical/virtual map is created.
- The relational map and the dataflow graph may be manually created and updated by an operator rather than being automatically discovered by agents. A drag and drop interface may be provided for this task.

The process 10 may be modified such that those alerts that relate to the HOST layer are processed as a preliminary matter as problems with this layer are likely to affect problems in all higher layers.

In a preferred embodiment, the component name typically comprises a combination of a host name and a port number and tests may be specific to a port number. In such a situation, the process may be modified such that, for each priority queue, a comparison is made between each the port number of each component name in the queue being processed and the port number associated with the test relating to the alert. If the comparison shows that the alert is independent of the port number, the component name associated with the alert is modified to represent the target host name alone. The top-to-bottom correlation process described above is then re-performed.

The use of configuration files may be replaced with database systems having tables to contain the required information.

The creation of a separate alert table may be omitted and in its place the report table may include the format of the alert table. In this manner, storage overheads can be reduced.

The dataflow graph may be omitted, resulting also in the omission of the end-to-end correlation process. In such a situation, the top-to-bottom correlation process is performed with reference to the layer model.

The layer model may have different layers to those described above and may include more or less layers as appropriate for the data network 100.

Similarly, the root-cause analysis process 10 need not be limited to the three priority queues described. Instead, the process may include two or more priority queues.

While the process has been described in the context of a monitoring system that employs agent programs, it should be appreciated that the same process may be implemented with any suitable agentless monitoring system.

The method by which users are informed of changes in the status of alert can vary. For instance, a report may be e-mailed to the administrator or a message sent by way of pager or SMS. Alternatively, the administrator may simply be notified by way of a message on the display of a monitoring station.

The data network to be analysed in accordance with the above method may be a subset of a larger data network.

It should be further appreciated by the person skilled in the art that feature disclosed above and in the embodiment described, where not mutually exclusive, may be combined to form yet further embodiments that fall within the scope of the present invention.

We claim:

1. An improved root-cause approach to problem diagnosis in data networks having one or more physical machines and one or more virtual machines, in the form of a method comprising:
   an agent program looped for repeatedly discovering and updating of information on a plurality of interdependencies and interconnections existing amongst the following: between a physical machine and a virtual machine, between a virtual machine and another virtual machine, between two applications running on the one or more physical machines or the one or more virtual machines, between an application and a virtual machine, between two network devices, and between one or more applications and one or more network devices,
   wherein said discovering and updating of information results in "discovered information" and wherein said physical machine, virtual machine, application, and network device are hereinafter individually or collectively referred to as "one or more components";
   wherein the discovered information is used for establishing a first relational map of the data network and a dataflow graph of the data network, and upon the repeating of resulting discovered information, generating a second relational map and dataflow graph; comparing the first relational map and dataflow graph to the second relational map and dataflow graph; if the second relational map and dataflow is the same as the first relational map and dataflow graph, then repeating the discovering and updating after a predetermined time period passes; and if the second relational map and dataflow graph is not the same as the first relational map and dataflow graph, then replacing the first relational map and dataflow graph; resulting in a dynamic and continuously updated discovery process;
   associating each metric in at least one set of metrics with at least one component;
   obtaining values for each such metric from a monitoring system;
   determining whether each such metric is indicative of a problem within the data network by determining the component from which the metric value has been obtained and comparing the value of the metric to a specific set value or range of values; and
   ranking and correlating indicative problems to determine whether a problem may be symptomatic of another problem based on the discovered information of
   an interconnection or an interdependency between the physical machine and the virtual machine, an interconnection or an interdependency between the virtual machine and the another virtual machine, an interdependency between the two applications, an interdependency between the application and the one or more virtual machines, an interdependency between the application and the one or more network devices, and an interconnection between the two network devices.

2. A method according to claim 1, further including obtaining and storing the discovered information on the interconnection and interdependencies between each physical machine and virtual machine in the data network and where the step of ranking and correlating indicative problems includes the sub-step of ranking and correlating indicative problems to determine whether a problem may be symptomatic of another problem based on the stored physical machine and virtual machine interconnection, and interdependency information.

3. A method according to claim 1 or claim 2, further including the step of obtaining and storing the discovered information on the interconnection and interdependencies between components, and where the step of ranking and correlating indicative problems includes the sub-step of performing end-to-end correlation of the indicative problems based on the stored component interconnection and interdependency information.

4. A method according to claim 1 including the steps of:
   defining a hierarchical layer model for each component;
   associating each layer in the hierarchical layer model with a set of metrics,
   where the step of ranking and correlating indicative problems includes the sub-step of performing top-to-bottom correlation of the indicative problems based, at least in part, on the hierarchical layer model.

5. A method according to 1, including defining a set of priority queues and the step of ranking the indicative problems is made with reference to the priority queues.

6. A method according to claim 3, including defining a set of priority queues and the step of ranking the indicative problems is made with reference to the priority queues where the step of performing end-to-end correlation is performed on each priority queue in turn.

7. A method according to claim 4, including defining a set of priority queues and the step of ranking the indicative problems is made with reference to the priority queues where the step of performing top-to-bottom correlation is performed between each priority queue and the next lowest priority queue, if any.

8. A method according to claim 5, including demoting any indicative problem determined to be symptomatic of another indicative problem to the next lowest of the priority queues where possible to do so.

9. A method according to claim 4, where those indicative problems relating to the layer upon which all other layers are dependent are processed first.

10. A method according to claim 1, where each indicative problem is associated with a component name which includes a port number and each metric is associated with a port number, the method including comparing the port number of the component name with the port number of the associated metric and, if the comparison shows that the indicative problem is independent of the port number, the component name is modified to delete the associated port number.

11. A method according to claim 1, including:
defining a hierarchical layer model for each component;
associating each layer in the hierarchical layer model with a set of metrics,
where the step of ranking and correlating indicative problems includes the sub-step of performing top-to-bottom correlation of the indicative problems based, at least in part, on the hierarchical layer model; and where those indicative problems relating to the layer upon which all other layers are dependent are processed first.

12. A method according to any one of claims 1, 5 and 7 including:
defining a hierarchical layer model for each component;
associating each layer in the hierarchical layer model with a set of metrics,
wherein the step of ranking and correlating indicative problems includes the sub-step of performing top-to-bottom correlation of the indicative problems based, at least in part, on the hierarchical layer model; and wherein those indicative problems relating to the layer upon which all other layers are dependent are processed first.

13. A system for implementing an improved root-cause approach to problem diagnosis in data networks having one or more physical machines and one or more virtual machines, the system comprising:
a monitoring system; and
an analytical agent, in data and control communication with the monitoring system
where the analytical agent is operable to repeatedly discover and update information on a plurality of interdependencies and interconnections existing amongst the following: between a physical machine and a virtual machine, between a virtual machine and another virtual machine, between two applications running on the one or more physical machines or the one or more virtual machines, between an application and a virtual machine, between two network devices, and between one or more applications and one or more network devices,
wherein said discovered and updated information results in "discovered information" "discovered information" and wherein said physical machine, virtual machine, application, and network device are hereinafter individually or collectively referred to as one or more components,
wherein the discovered information is used to establish a first relational map of the data network and a dataflow graph of the data network, and upon the analytical agent repeating obtaining discovered information, a second relational map and dataflow graph is generated; the system operates to compare the first relational map and dataflow graph to the second relational map and dataflow graph; if the second relational map and dataflow graph is the same as the first relational map and dataflow graph, then repeating the discovering and updating after a predetermined time period passes; and if the second relational map and dataflow graph is not the same as the first relational map and dataflow graph, then replacing the first relational map and dataflow graph; such that a dynamic and continuously updated discovery process results;
the analytical agent is operable to associate each metric in at least one set of metrics with at least one component and obtain values for each such metric from the monitoring system,
the analytical agent thereafter operable to determine whether each such metric is indicative of a problem with the data network by determining the component from which the metric value has been obtained and comparing the value of the metric to a specific set value or range of values, and rank and correlate the indicative problems to determine whether a problem may be symptomatic of another problem based on the discovered information of
an interconnection or an interdependency between the physical machine and the virtual machine, an interconnection or an interdependency between the virtual machine and the another virtual machine, an interdependency between the two applications, an interdependency between the two applications and the one or more virtual machines, and an interdependency between the one or more application and the one or more network devices.

14. A non-transitory computer readable medium having computer software recorded thereon such that, when the computer software is executed by a suitable processing system, the computer software is operable to:
repeatedly discover and update information on a plurality of interdependencies and interconnections on a data network existing amongst the following: between a physical machine and a virtual machine, between a virtual machine and another virtual machine, between two applications running on the one or more physical machines or the one or more virtual machines, between an application and a virtual machine, between two network devices, and between one or more applications and one or more network devices,
wherein said discovered and updated information results in "discovered information" and wherein said physical machine, virtual machine, application, and network device are hereinafter individually or collectively referred to as "one or more components",
wherein the computer software is operable to use the discovered information for establishing a first relational map of the data network and a dataflow graph of the data network, and upon the repeating obtaining discovered information, generating a second relational map and dataflow graph; the computer software operable to compare the first relational map and dataflow graph to the second relational map and dataflow graph; if the second relational map and dataflow graph is the same as the first relational map and dataflow graph, then repeating the discovering and updating after a predetermined time period passes; and if the second relational map and dataflow graph is not the same as the first relational map and dataflow graph, then replacing the first relational map and dataflow graph; such that a dynamic and continuously updated discovery process results;

associate each metric in a at least one set of metrics with at least one component;

obtain values for each such metric from a monitoring system;

determine whether each such metric is indicative of a problem within the data network, the data network having one or more physical machines and one or more virtual machines, by determining the component from which the metric value has been obtained and comparing the value of the metric to a specific set value or range of values; and rank and correlate indicative problems to determine whether a problem may be symptomatic of another problem based on the discovered information of an interconnection or an interdependency between the physical machine and the virtual machine, an interconnection or an interdependency between the virtual machine and the another virtual machine, an interdependency between the two applications, an interdependency between the two applications and the one or more virtual machines, and an interdependency between the one or more application and the one or more network devices.

* * * * *